(12) United States Patent
Fischer et al.

(10) Patent No.: US 6,763,107 B1
(45) Date of Patent: Jul. 13, 2004

(54) METHOD AND APPARATUS FOR REDUCING DISTORTION IN A LINE POWERED MODULATOR CIRCUIT

(75) Inventors: Jonathan Herman Fischer, Blandon, PA (US); Keith Eugene Hollenbach, Kutztown, PA (US); Donald Raymond Laturell, Allentown, PA (US); Lane A. Smith, Easton, PA (US); Weilin Zhu, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/431,913

(22) Filed: Nov. 2, 1999

(51) Int. Cl.[7] ................................................. H04M 9/00
(52) U.S. Cl. ................................. 379/399.01; 379/93.05
(58) Field of Search ........................... 379/399.01, 400, 379/399.02, 413, 413.01, 413.02, 93.05, 93.09, 93.01, 93.06, 402, 403, 387.01, 391, 398, 413.04

(56) References Cited

U.S. PATENT DOCUMENTS

| | | | | |
|---|---|---|---|---|
| 4,059,727 A | * | 11/1977 | Kingswell et al. | 379/93.01 |
| 4,400,588 A | * | 8/1983 | Stobbs et al. | 379/392 |
| 4,578,533 A | * | 3/1986 | Pierce | 379/377 |
| 4,803,719 A | * | 2/1989 | Ulrich | 379/399.01 |
| 5,528,685 A | * | 6/1996 | Cwynar et al. | 379/405 |
| 5,553,138 A | * | 9/1996 | Heald et al. | 379/413 |
| 5,790,653 A | * | 8/1998 | Fairbanks et al. | 379/372 |
| 5,790,656 A | * | 8/1998 | Rahamim et al. | 379/399.01 |
| 6,421,430 B1 | * | 7/2002 | Hollenbach et al. | 379/93.36 |
| 6,470,084 B1 | * | 10/2002 | Van Zanten | 379/413 |

* cited by examiner

*Primary Examiner*—Rexford Barnie (57) ABSTRACT

A method and apparatus for a telephone line interface or data access arrangement (DAA) which includes a shunt regulator in series with a line modulator. A sense resistor is placed in series between the shunt regulator and the line modulator to provide a measurement of the amount of current distortion in the DAA. The line modulator contains a Darlington pair which reduces the amount of current drawn by the line modulator, allowing the sense resistor to sense a majority of the system current. The voltage across the sense resistor is fed back to the line modulator. The line modulator is capable of adjusting the AC modulation and the DC termination presented to the telephone line. The method includes drawing power from the telephone line using a shunt regulator, modulating the telephone line in series with the shunt regulator, sensing a level of distortion in the DAA, and feeding the sensed level of distortion to the line modulator.

18 Claims, 6 Drawing Sheets

METHOD AND APPARATUS FOR REDUCING DISTORTION IN A LINE POWERED MODULATOR CIRCUIT

FIELD OF THE INVENTION

This invention relates to a low noise telephone line interface for data access arrangements (DAA). Specifically, it relates to a low distortion line powered DAA having improved linearity and accuracy.

BACKGROUND OF THE INVENTION

Figure 2:
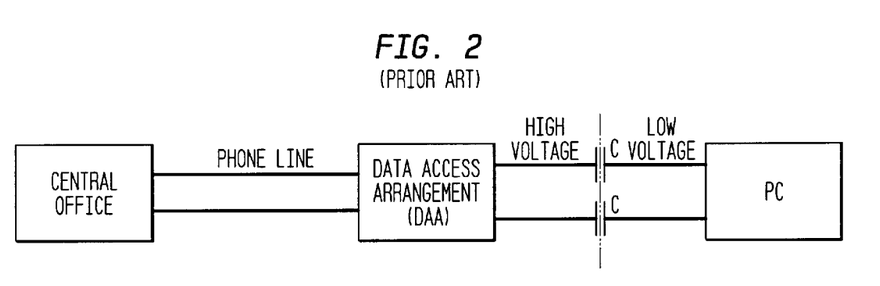
FIG. 2 is a block diagram of a conventional interface between a telephone network and an electric main powered device in accordance with the prior art.

The telephone lines to a residence in the United States and elsewhere can have common mode voltages of over 100V, and the FCC requires the telephone lines to be isolated from any electric main powered device (such as a PC) connected to the telephone lines (through a modem for example) to prevent damage to the telephone network. 47 CFR 68.302,4 (10-1-97 Edition). A data access arrangement (DAA) is specified by the FCC to isolate the telephone lines from electric main powered devices, such as illustrated in FIG. 2. Since the voice band modem signal is limited to the 100 to 3600 Hz band, a DAA can be constructed using a transformer which operates as a bandpass filter to isolate the electric main powered device from the telephone lines.

A smaller size and potentially lower cost solution uses active circuits to communicate with the central telephone offices and various modulation techniques to couple the DAA through small capacitors to the PC.

Figure 3:
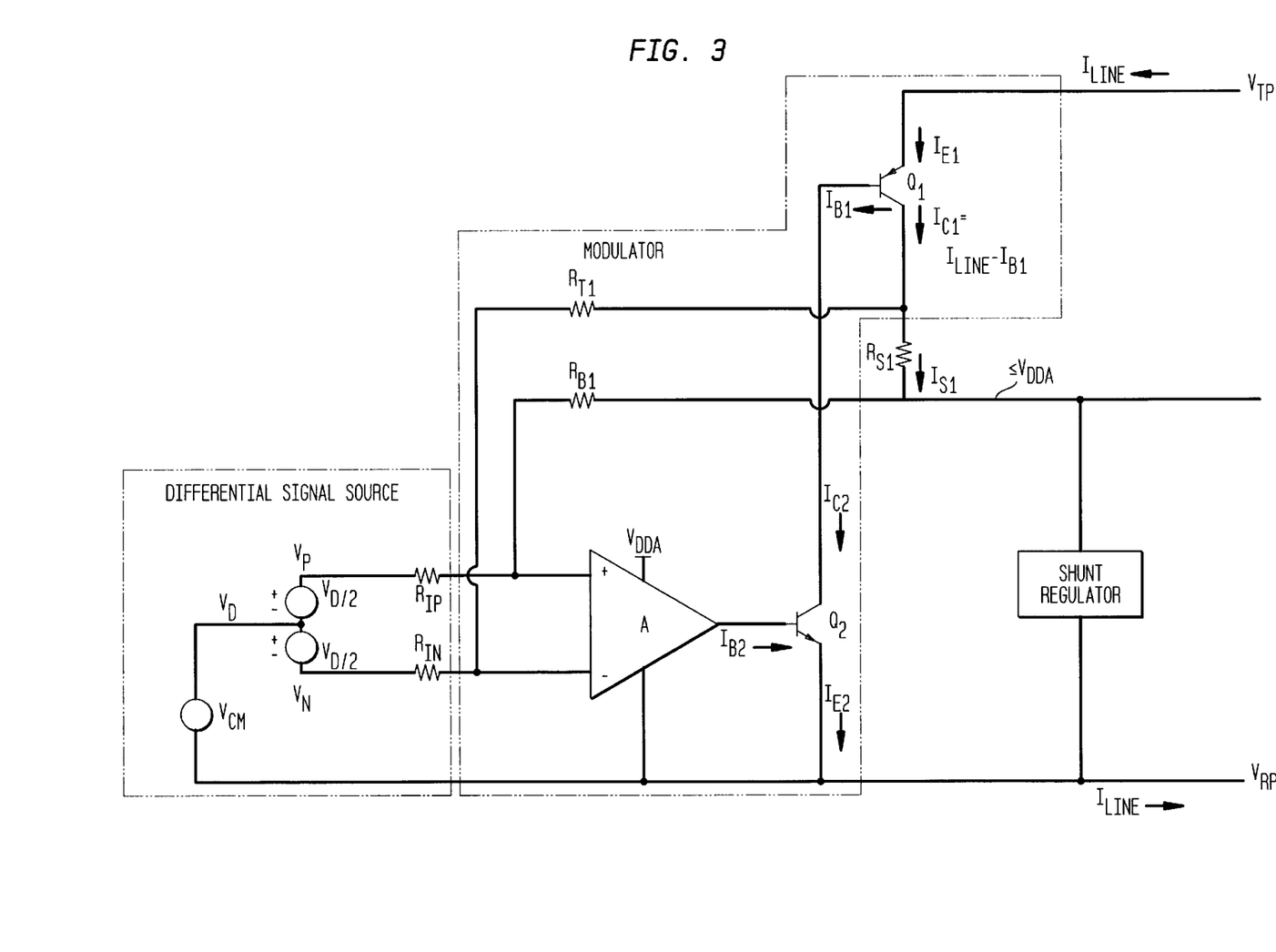
FIG. 3 is a circuit diagram of a data access arrangement (DAA) in accordance with known art.

FIG. 3 shows a known line powered telephone line interface circuit for modulating a data signal onto a telephone line using active circuits. The circuit of FIG. 3 is disclosed and described fully in U.S. patent application Ser. No. 09/028,061 filed on Feb. 26, 1998, entitled Low Noise Line Powered DAA With Feedback, assigned to the same assignee as the present application, and incorporated herein by reference. The circuit is designed in low voltage CMOS technology and can handle only a small amount of voltage. The main function of the circuit is to take the incoming current $I_{LINE}$ supplied by the telephone company and modulate it with a data signal developed by processing a differential data source signal $V_D$ with a line modulator so as to place the data signal on the telephone line. The circuit uses transistor $Q_1$ as a line modulator, and contains a shunt regulator in series with the line modulator $Q_1$. A sense resistor $R_{S1}$ is placed in series between the line modulator $Q_1$ and the shunt regulator to monitor the current through the shunt regulator.

The circuit depicted in FIG. 3 works by monitoring the current through sense resistor $R_{S1}$ with a feedback loop around the amplifier A. Resistors $R_{T1}$ and $R_{B1}$ sense the differential voltage across $R_{S1}$. By setting $R_{T1}=R_{B1}$, the current through $R_{T1}$ and $R_{B1}$ will accurately model the current through $R_{S1}$. The desired signal to be modulated is introduced by a differential data source signal $V_D$. The differential signal is created by adding signal $V_D/2$ to $V_{CM}$ to create $V_P$ and subtracting $V_D/2$ from $V_{CM}$ to create $V_N$. This differential signal then drives the input resistors $R_{IP}$ and $R_{IN}$ to provide a differential signal input current. The generation of the differential signal current is well known in the art and will not be further discussed herein. The control amplifier operates to force the current through resistor $R_{S1}$ to equal the desired signal current by regulating transistor $Q_2$ to control the base of transistor $Q_1$, which in turn regulates the current through the source-emitter path of transistor $Q_1$ and thereby through resistor $R_{S1}$. In this circuit, the collector current of transistor $Q_1$ is well controlled by the control amplifier A. However, this arrangement incurs a degree of error which is problematic for new communication devices such as high speed data modems. The source of the error is due to current that is outside of the path containing the sense resistor $R_{S1}$. This stray current will be discussed after a brief discussion of FIG. 4.

Figure 4:
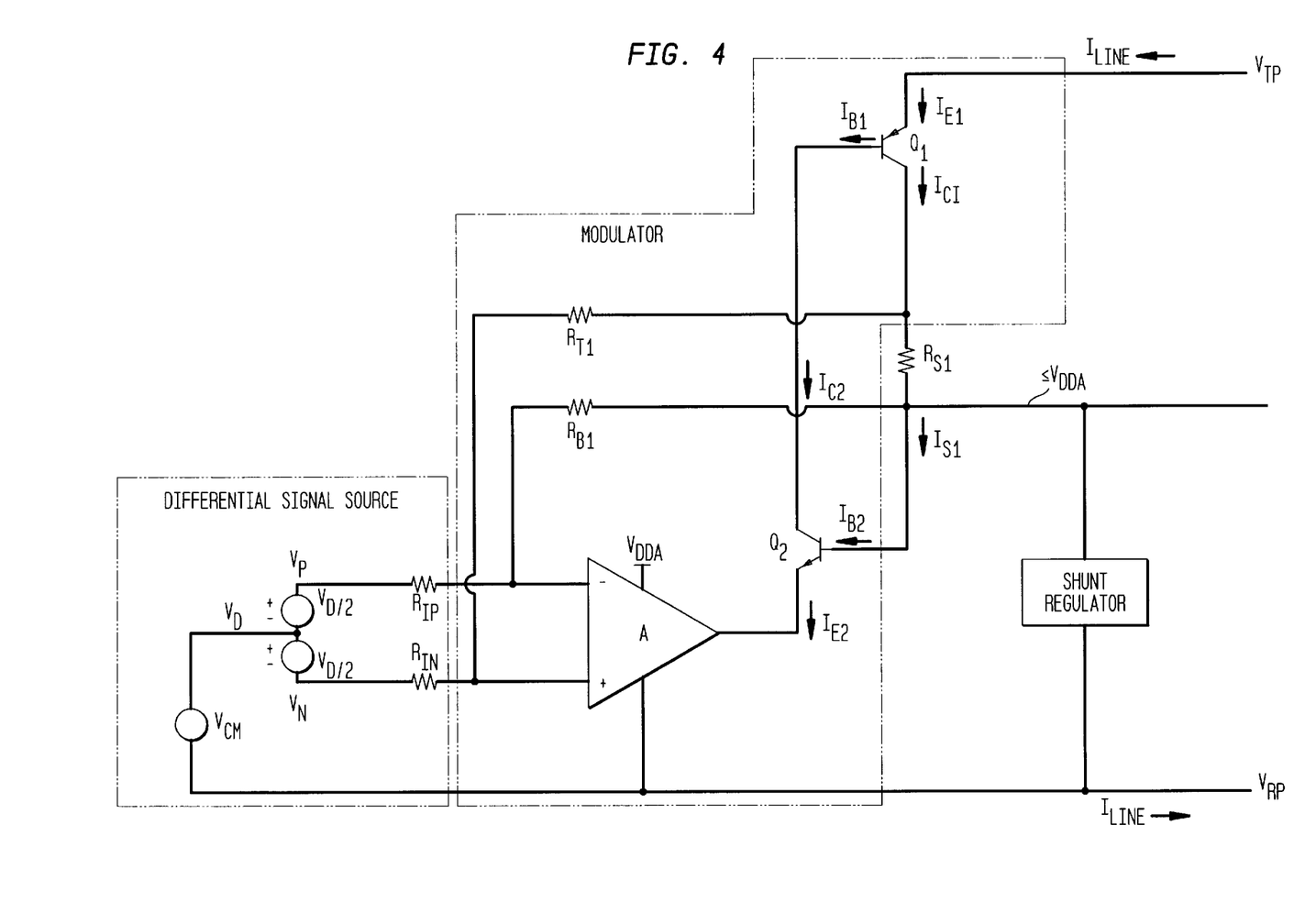
FIG. 4 is a circuit diagram of an alternative data access arrangement (DAA) in accordance with known art.

FIG. 4 depicts an alternative circuit arrangement similar to the circuit depicted in FIG. 3. However, the circuit in FIG. 4 uses the output of amplifier A to control the emitter of transistor $Q_2$, rather than the base of transistor $Q_2$, and thereby the collector current of transistor $Q_1$. As in the circuit depicted in FIG. 3, the collector current of transistor $Q_1$ is well controlled by the control amplifier A. This arrangement also incurs a degree of error which is problematic for new communication devices such as high speed data modems.

The error associated with the previously mentioned circuit designs of FIG. 3 and FIG. 4 will now be discussed. Ideally, the current through $R_{S1}$ would equal the current, $I_{LINE}$, introduced to the system by the telephone company. This would allow amplifier A to take all of $I_{Line}$ into account when modulating the differential signal source onto $I_{Line}$. An error exists in the line modulation devices of FIG. 3 and FIG. 4 due to the inclusion of only part of the total current $I_{LINE}$ through sense resistor $R_{S1}$. In both circuits, the current from the telephone company is introduced to the system through the emitter of transistor $Q_1$ (hereinafter "$I_{E1}$"). In the circuits depicted in FIG. 3 and FIG. 4, $I_{E1}$ is equal to $I_{LINE}$, the resistances of $R_{T1}$ and $R_{B1}$ are a couple hundred thousand ohms, and the resistance of $R_{S1}$ is 10–20 ohms. Because of the relatively high level of resistance of $R_{T1}$ and $R_{B1}$, the current that flows through $R_{T1}$ and $R_{B1}$ can be neglected in the circuit analysis. As current flows through the circuits, $I_{E1}$ is divided into the transistor $Q_1$ base current (hereinafter "$I_{B1}$") and the transistor $Q_1$ collector current (hereinafter "$I_{C1}$"). The collector current $I_{C1}$ through the resistor $R_{S1}$ is used by amplifier A in a feedback loop to modulate the desired signal onto $I_{LINE}$. Since the current $I_{B1}$ is outside the feedback loop, an error term in the amount of $I_{B1}$ is introduced to the circuit, that is, $I_{C1}$ through resistor $R_{S1}$ is not equal to $I_{LINE}$, but is equal to $I_{E1}-I_{B1}$ or $I_{LINE}-I_{B1}$.

An additional problem arises from $I_{B1}$ being outside the amplifier feedback path. Since $I_{C1}$ and $I_{B1}$ are related by the β of $Q_1$, and the β of a transistor is a function of the actual signal level, the error term introduced by not accounting for current $I_{B1}$ in the feedback loop is signal dependent. Signal dependent error terms are a source of harmonic distortion which is problematic for communication devices. In order for current 56 k modems (V.90 standard) to function, a signal to distortion ratio greater than 80 dB is needed. Unfortunately, due to the error term introduced by neglecting $I_{B1}$, the circuits of FIG. 3 and FIG. 4 can provide a signal to distortion ratio of only about 75dB, even when high quality components are utilized.

Figure 5:
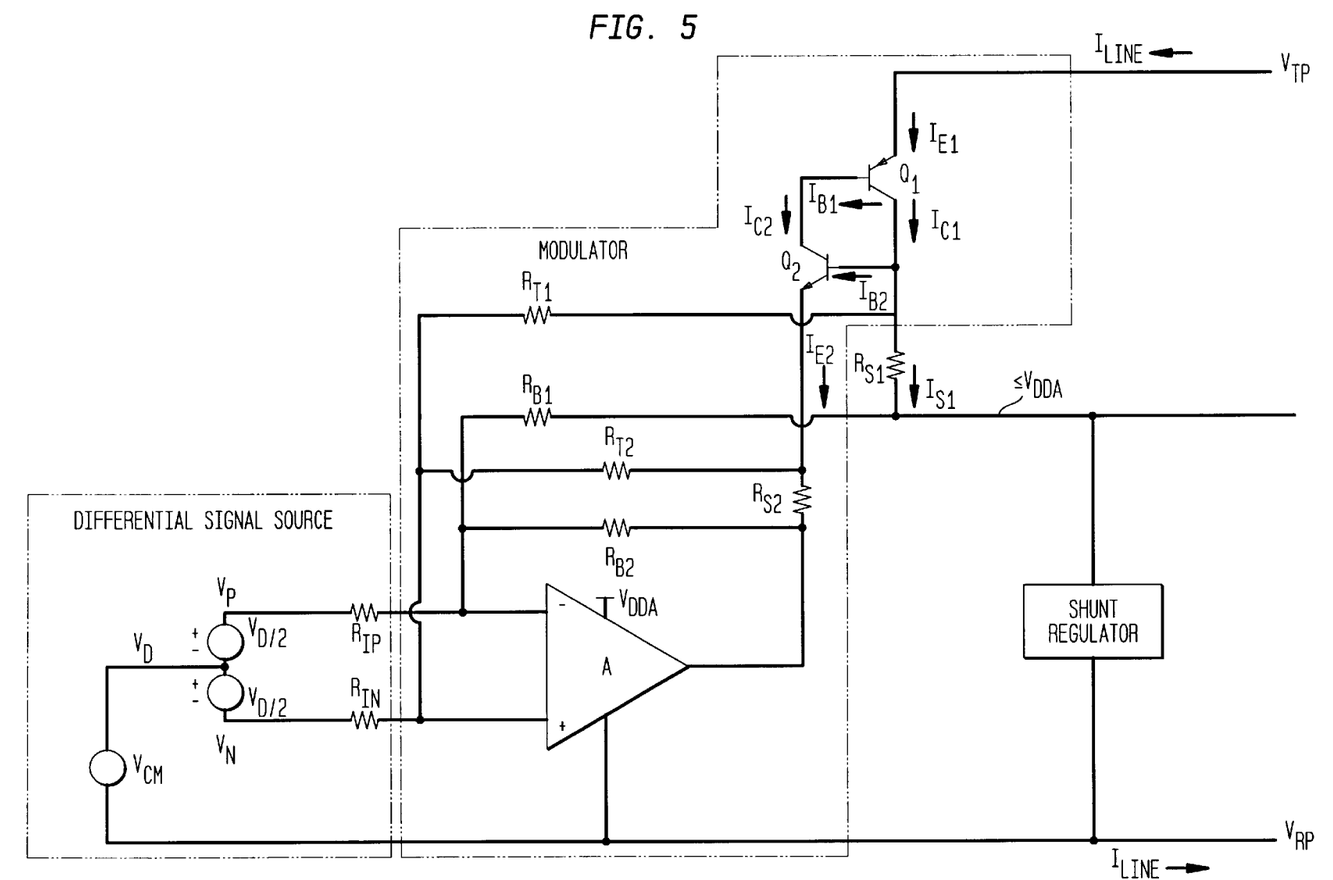
FIG. 5 is a circuit diagram of an alternative data access arrangement (DAA) in accordance with known art.

One method which has been used to reduce distortion is depicted in FIG. 5. The circuit is disclosed and described fully in U.S. patent application Ser. No. 09/280,473 filed on Mar. 30, 1999, entitled Method and Apparatus for Decreasing Distortion in a Line Powered Modulator Circuit, assigned to the same assignee as the present application, and incorporated herein by reference.

The circuit in FIG. 5 reduces distortion by incorporating a larger portion of $I_{LINE}$ into the feedback path of the control amplifier A. A larger portion of $I_{LINE}$ is incorporated by including a second sense resistor $R_{S2}$ in a second feedback path to amplifier A in order to sense current introduced to the system by $I_{LINE}$ which does not flow through the first sense resistor $R_{S1}$. The operation of the differential signal source and the shunt regulator are similar to the differential signal source and shunt regulator discussed above. In addition, as with $R_{T1}$ and $R_{B1}$, $R_{T2}$ and $R_{B2}$ have a relatively high level of resistance and the current that flows through $R_{T2}$ and $R_{B2}$ can be neglected in the circuit analysis.

In FIG. 5, the output of amplifier A is electrically connected to the emitter of transistor $Q_2$ through the additional sense resistor $R_{S2}$, the collector of transistor $Q_2$ is electrically connected to the base of transistor $Q_1$, and the base of transistor $Q_2$ is electrically connected to the collector of transistor $Q_1$. In this configuration, the original sense resistor current $I_{S1}$ through the primary sense resistor $R_{S1}$ is equal to the transistor $Q_1$ collector current $I_{C1}$ less the transistor $Q_2$ base current $I_{B2}$. Accordingly, the transistor $Q_2$ base current $I_{B2}$ equals the transistor $Q_1$ collector current $I_{C1}$ less the original sense resistor current $I_{S1}$. The current through the additional sense resistor $R_{S2}$ is the transistor $Q_2$ emitter current $I_{E2}$, or equivalently the sum of the transistor $Q_2$ base current $I_{B2}$ and collector current $I_{C2}$. Since the transistor $Q_2$ collector current $I_{C2}$ equals the transistor $Q_1$ base current $I_{B1}$, the current through the additional sense resistor $Q_2$ can also be said to be the sum of the currents $I_{B1}$ and $I_{B2}$. Therefore, the sum of the currents through both sense resistor $R_{S1}$ $R_{S2}$ equals $(I_{B1}+I_{B2}+I_{C1}-I_{B2})$, or equivalently $I_{B1}+I_{C1}$, which equals $I_{LINE}$. This arrangement results in a circuit which is virtually free from distortion. The circuit is free from distortion because the first sense resistor $R_{S1}$ senses the current and its associated distortion through the shunt regulator, and the second sense resistor $R_{S2}$ senses all other significant currents and their associated distortion, allowing the amplifier to control $I_{LINE}$ by incorporating all of $I_{LINE}$ in a feedback path.

This method and apparatus for reducing distortion in a line powered DAA requires the amplifier to sense the level of current at multiple locations. Since the level of current through a resistor depends on the resistance of the resistor, the resistors at the various locations must be carefully matched in order to obtain an accurate relationship between $I_{LINE}$ and the current sensed by the amplifier. In addition, the introduction of each additional sense resistor requires the addition of high value resistors such as $R_{T2}$ and $R_{B2}$.

SUMMARY OF THE INVENTION

The present invention provides a novel method and apparatus for increasing the signal to distortion ratio in a line powered telephone line interface or data access arrangement (DAA). The invention accomplishes this task by reducing the amount of error which is inherent to prior art circuit designs by adapting the circuits to incorporate more of the total line current supplied by the telephone company into a single feedback circuit containing a sense resistor.

The invention modifies the prior art circuits by replacing the primary modulation transistor used to modulate the telephone company line current, $I_{LINE}$, with a Darlington pair. By using a Darlington pair to modulate $I_{LINE}$, much less current flows through the modulator portion of the circuit. Since less current is flowing through the modulator circuit, more of $I_{LINE}$ flows through the single sense resistor. This allows the amplifier to modulate $I_{LINE}$ taking into account a majority of the current introduced by $I_{LINE}$, resulting in enhanced distortion characteristics in the circuit, without the need of introducing additional sense resistors and feedback paths. The amplifier can sense substantially all of $I_{LINE}$ within the circuit and process accordingly to remove noise and distortion. This arrangement results in a modulation circuit capable of producing a signal to distortion ratio that is greater than 80 dB.

DETAILED DESCRIPTION OF THE INVENTION

The present invention discloses a line powered data access arrangement (DAA) device having a desirable signal to distortion ratio. The present invention is particularly useful for modern telephone modems (V.90 standard) which require a signal to distortion ratio greater than 80 dB.

Figure 1:
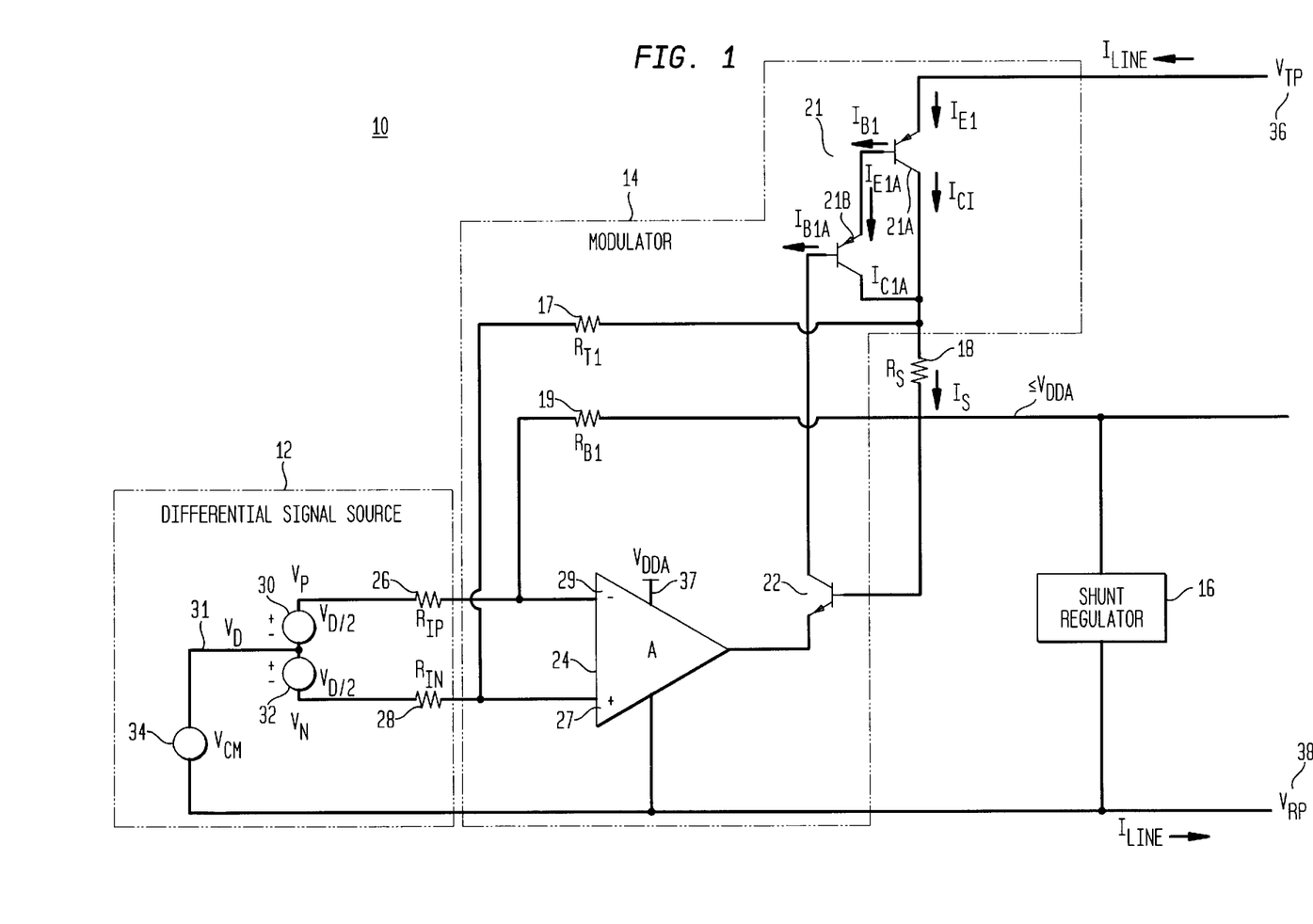
FIG. 1 is a circuit diagram of a low noise line powered DAA in accordance with a preferred embodiment of the present invention.

FIG. 1 illustrates a telephone line interface 10 having a differential signal source 12, line modulator 14, shunt regulator 16, and a first sense resistor 18. The line modulator 14 comprises a Darlington pair 21 made up of transistors 21A and 21B, an amplifier 24, and a transistor 22.

Referring to FIG. 1, the differential signal source 12 functions by adding half of the desired signal voltage 31 to the common mode voltage 34 to create voltage signal 30 and subtracting half of the signal voltage 31 from common mode voltage 34 to create voltage signal 32. These differential signals 30 and 32 then drive the input resistors 26 and 28 to provide a differential signal input current into the amplifier 24 at the inverting input 29 and at the non-inverting input 27. The generation of the differential signal currents can be made by other means which are well known in the art, and thus will not be further discussed.

The shunt regulator 16 provides power drawn from the telephone line to the line modulator circuit 14 as well as to other modem and/or data processing circuitry necessary to provide DC termination and AC modulation of the telephone line. The shunt regulator 16 limits the voltage across system components which are in parallel with the shunt regulator 16 to voltage level $V_{DDA}$. The shunt regulator 16 is especially important if the amplifier 24 and other circuitry is fabricated in low voltage CMOS technology that cannot withstand voltages above 5 volts (or other fabrication technologies with low voltage requirements). Since the voltage difference between the telephone line tip voltage 36 and the telephone line ring voltage 38 can range from 5 to 56 volts, the DAA 10 could be destroyed in the absence of shunt regulator 16.

The sense resistor 18 is used in a feedback loop by the control amplifier 24 located within line modulator circuit 14. By monitoring the current through sense resistor 18 with a feedback loop, the amplifier 24 can compensate for distortion in the DAA 10. Resistors 17 and 19 sense the differential voltage across sense resistor 18. By setting the resistance of resistor 17 equal to the resistance of resistor 19, the current through resistors 17 and 19 will accurately model the current through resistor 18. In a preferred embodiment, the resistance of resistors 17 and 19 is several hundred thousand ohms, while the resistance of the sense resistor 18 is approximately 10–20 ohms. Because of the relatively large resistance of resistor 17 and 19, the current through these resistors can be neglected in the circuit analysis.

The present invention is directed toward reducing distortion in a line powered DAA 10 using a single feedback path. Low distortion is achieved in the present invention by incorporating most of $I_{LINE}$ into the single feedback path of amplifier 24 and using amplifier 24 to compensate for the distortion in the path. The present invention accomplishes passing most of $I_{LINE}$ through a single feedback path by using a Darlington pair 21 comprised of transistors 21A and 21B in the line modulator. The use of a Darlington pair 21 results in only a small amount of current falling outside of the path containing sense resister 18, allowing the majority of $I_{LINE}$ to pass through the single sense resister 18. By sensing most of the current in DAA 10, the amplifier 24 can incorporate most of the total DAA current with a feedback loop and thereby reduce the harmonic distortion in the DAA 10.

Figure 1A:
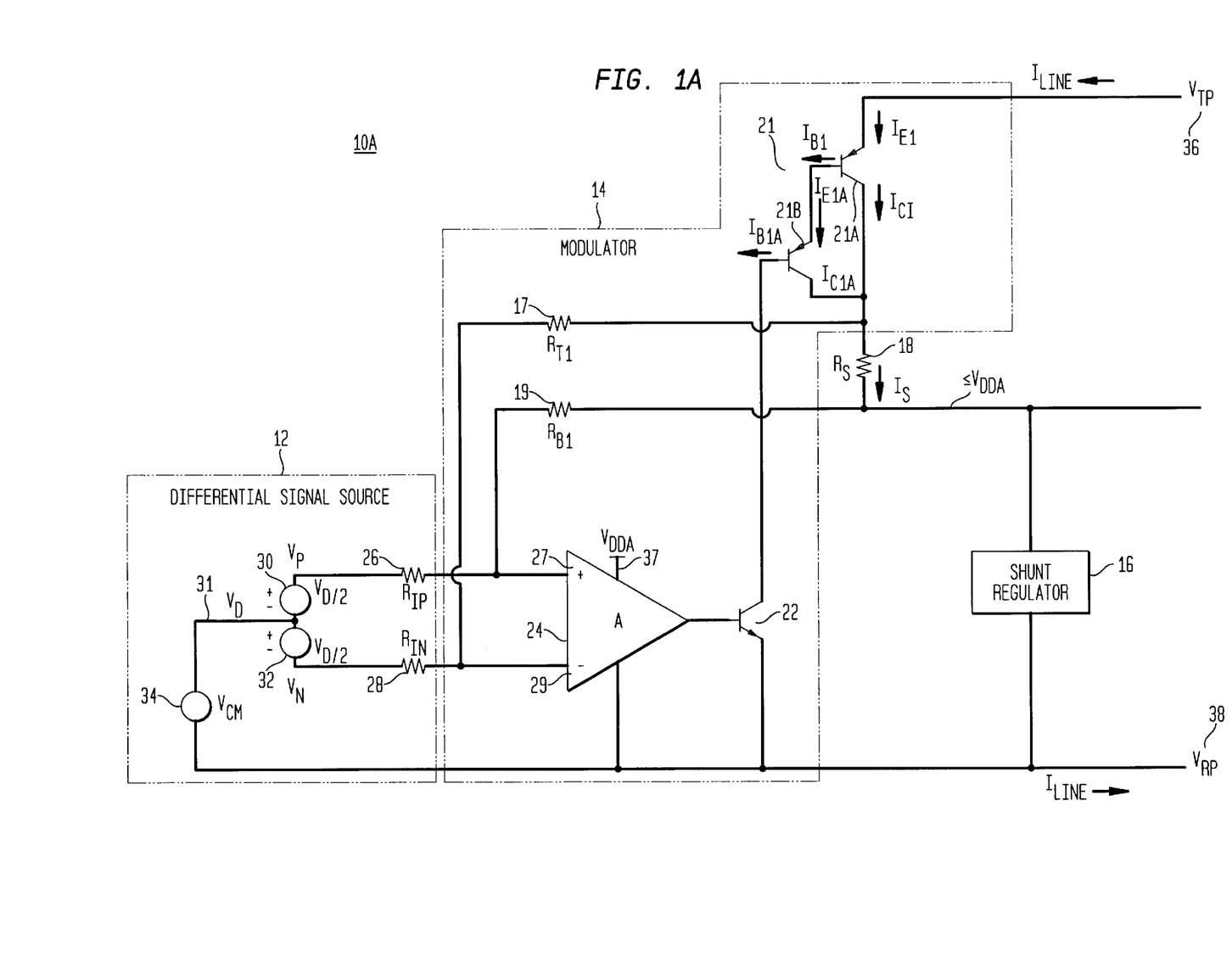
FIG. 1A is a circuit diagram of a low noise line powered DAA in accordance with an alternative embodiment of the present invention.

The Darlington pair 21 comprised of transistors 21A and 21B, as depicted in FIGS. 1 and 1A will be referenced in the specification using the naming convention which follows: the base of transistor 21B will be referred to as the base of the Darlington pair 21 or the control terminal of the Darlington pair 21, and the emitter and collector of transistor 21A will be referred to as the emitter and collector of the Darlington pair 21 or the current flow terminals of the Darlington pair 21.

The control amplifier 24 senses the current through sense resistor 18 with a feedback loop and attempts to control the circuit in the following manner. Resistors 17 and 19 sense the differential voltage across sense resistor 18. By setting resistor 17 equal to resistor 19 the current through resistor 17 into the non-inverting input 27 of control amplifier 24 and the current through resistor 19 into the inverting input 29 of control amplifier 24 will accurately model the sum of currents through sense resistor 18. This approximately models $I_{LINE}$ and is the parameter to be controlled. The feedback action of the loop comprising amplifier 24, transistor 22, transistor 21A, and transistor 21B adjusts the current through resistor 18 such that the current through resistor 17 equals the current from the differential signal source 12 through resistor 26, and the current through resistor 19 equals the current from the differential signal source 12 through resistor 28.

In a preferred embodiment of the invention, as depicted in FIG. 1, the output of amplifier 24 is electrically connected to the emitter of transistor 22, the collector of transistor 22 is electrically connected to the base of the Darlington pair 21, and the base of transistor 22 is electrically connected to the collector of the Darlington pair 21 through sense resistor 18. In this configuration, the telephone line current $I_{LINE}$ is introduced to the DAA 10 through the emitter of Darlington pair 21. $I_{LINE}$ is equal to the transistor 21A emitter current $I_{E1}$. Current $I_{E1}$ is then split into the transistor 21A base current $I_{B1}$ and collector current $I_{C1}$. The transistor 21A base current is then split into the transistor 21B base current $I_{B1A}$ and collector current $I_{C1A}$. The sense resistor current $I_S$ through the sense resistor 18 is equal to the transistor 21A collector current $I_{C1}$ plus the transistor 21B collector current $I_{C1A}$. Since current $I_{C1}$ is equal to $I_{LINE}$ minus $I_{B1}$, and $I_{C1A}$ is equal to $I_{B1}$ minus $I_{B1A}$, the current $I_S$ through sense resistor 18 equals $I_{LINE}$ minus $I_{B1A}$ (i.e., $I_{LINE}-I_{B1}+I_{B1}-I_{B1A}=I_{LINE}-I_{B1A}$). Although there is still a degree of error in the system, the error is reduced from $I_{B1}$ to $I_{B1A}$. The difference in magnitude between $I_{B1}$ and $I_{B1A}$ is the β of transistor 21B (β is typically greater than 50).

This arrangement results in a circuit which is virtually free from distortion. The circuit exhibits low distortion because the sense resistor 18 senses most of the current and its associated distortion through the DAA 10, allowing the amplifier 24 to control $I_{LINE}$ by incorporating most of $I_{LINE}$ into the feedback path and compensating for the associated distortion. Even though this arrangement still contains a small amount of error, it produces a signal to distortion ratio suitable for present communication devices (>80 dB).

In an alternative embodiment of the present invention, as depicted in FIG. 1A, the output of amplifier 24 is electrically connected to the base of transistor 22, the collector of transistor 22 is electrically connected to the base of transistor 21B, and the emitter of transistor 22 is electrically connected to the telephone line ring voltage 38. The collector of the Darlington pair 21 is connected to the shunt regulator 16 through sense resistor 18. In this configuration, the sense resistor current $I_S$ is equal to the telephone $I_{LINE}$ minus $I_{B1A}$, as in the preferred embodiment. As in the preferred embodiment there is still a degree of error in the system, however, the error is reduced from $I_{B1}$ to $I_{B1A}$. The difference in magnitude between $I_{B1}$ and $I_{B1A}$ is the β of transistor 21B (β is typically greater than 50).

This arrangement also results in a circuit which is virtually free from distortion. The circuit exhibits low distortion because the sense resistor 18 senses most of the current and its associated distortion through the DAA 10, allowing the amplifier 24 to control $I_{LINE}$ by incorporating most of $I_{LINE}$ into the feedback path and compensating for the associated distortion. Even though this arrangement still contains a small amount of error, it also produces a signal to distortion ratio suitable for present communication devices (>80 dB).

Accordingly, the present invention provides a low noise DAA 10 that is particularly useful for modern modems which require a high signal to distortion ratio. By significantly reducing the amount of distortion in the DAA, the present invention allows transistors 21A, 21B and 22 to be specified based on breakdown voltage, with minimal β requirements. Reducing the need for transistors with very specific β requirements allows for the use of less expensive components to achieve overall cost reduction.

To facilitate discussion, bipolar junction transistors (BJTs) are shown in the figures and used to describe the preferred embodiments. However, the present invention may incorporate bipolar junction transistors (BJTs), field effect transistors (FETs), or a combination of BJTs and FETs. Therefore, the terminology used in the claims will be as follows: the base in a BJT and the gate in a FET will be referred to as the control terminal of the transistor, and the collector-emitter terminals of a BJT and the drain-source terminals of a FET will be referred to as the current flow terminals of the transistor.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A telephone line interface circuit for placing an information signal on a telephone line comprising:
   a line modulator for receiving an information signal, wherein said line modulator comprises a Darlington pair coupled to said telephone line for modulating said telephone line with said information signal;
   a sense resistor coupled to said line modulator so as to sense a current through said line modulator; and
   a feedback path from said sense resistor to said line modulator;
   such that said line modulator incorporates said current through said sense resistor and said information signal.

2. The telephone line interface circuit as set forth in claim 1 further comprising a shunt regulator coupled in series with said sense resistor on said telephone line.

3. A telephone line interface circuit for placing an information signal on a telephone line comprising:
   a line modulator for receiving an information signal, wherein said line modulator comprises:
      a Darlington pair coupled to said telephone line for modulating said telephone line with said information signal; and
      an amplifier having an output coupled to a control terminal of said Darlington pair so as to control the current flowing through current flow terminals of said Darlington pair, said amplifier being coupled to receive at inputs thereto said current through said sense resistor and said information signal;
   a sense resistor coupled to said line modulator so as to sense a current through said line modulator;
   a shunt regulator coupled in series with said sense resistor on said telephone line; and
   a feedback path from said sense resistor to said line modulator;
   such that said line modulator incorporates said current through said sense resistor and said information signal.

4. A telephone line interface circuit as set forth in claim 3 wherein said line modulator comprises a transistor coupled between said output terminal of said amplifier and said control terminal of said Darlington pair, such that said current flowing through said current flow terminals of said Darlington pair is controlled as a function of said current through said first resistor and said information signal.

5. A telephone line interface circuit as set forth in claim 3 wherein a first of said current flow terminals of said Darlington pair is coupled with said sense resistor and a second of said current flow terminals is coupled with said telephone line.

6. A telephone line interface circuit as set forth in claim 5 wherein said line modulator further comprises a transistor having a collector coupled to said control terminal of said Darlington pair, an emitter coupled to said output terminal of said amplifier, and a base terminal coupled between said Darlington pair and said sense resistor, such that said current flowing through said current flow terminals of said Darlington pair is controlled as a function of said current through said first resistor and said information signal.

7. A telephone line interface circuit as set forth in claim 5 wherein said line modulator further comprises a transistor having a control terminal coupled to said output terminal of said amplifier, a collector coupled to said control terminal of said Darlington pair, and an emitter coupled to said telephone line, such that said current flowing through said current flow terminals of said Darlington pair is controlled as a function of said current through said first resistor and said information signal.

8. A telephone line interface circuit for placing an information signal on a telephone line comprising:
   a shunt regulator;
   a sense resistor in series with said shunt regulator for sensing a current through said shunt regulator;
   a line modulator electrically connected to said sense resistor and said shunt regulator, wherein said line modulator comprises a Darlington pair; and
   a feedback path from said sense resistor to said line modulator.

9. The telephone line interface according to claim 8, wherein:
   said telephone line interface is a data access arrangement for a modem.

10. A telephone line interface circuit for placing an information signal on a telephone line comprising:
    a sense resistor for sensing a current on said telephone line;
    a Darlington pair in series with said sense resistor;
    a transistor coupled to the base of said Darlington pair;
    an amplifier having an input for accepting an information signal and an output electrically connected to said transistor for modulating said telephone line with said information signal; and
    a feedback path from said sense resistor to said amplifier.

11. The telephone line interface circuit according to claim 10, wherein;
    said transistor is a bipolar transistor; and
    said Darlington pair comprises bipolar transistors.

12. The telephone line interface circuit according to claim 10, wherein;
    said transistor is a npn bipolar transistor; and
    said Darlington pair comprises pnp bipolar transistors.

13. The telephone line interface circuit according to claim 12, wherein;
    said amplifier controls the emitter of said transistor; and
    said transistor controls the base of said Darlington pair through the collector of said transistor;
    such that said amplifier controls said Darlington pair.

14. The telephone line interface circuit according to claim 13, wherein;
    the base of said transistor is connected to the collector of said Darlington pair through said sense resistor.

15. The telephone line interface circuit according to claim 12, wherein;
    said amplifier controls the base of said transistor; and
    said transistor controls the base of said Darlington pair through the collector of said transistor;
    such that said amplifier controls said Darlington pair.

16. A method for placing an information signal on a telephone line, said method comprising:
    modulating said telephone line with a modulator, said modulator comprising a Darlington pair;
    sensing a current passing through said modulator; and
    feeding back said current to said modulator.

17. A telephone line interface circuit for placing an information signal on a telephone line, comprising:
    means for drawing power from a telephone line;
    means for modulating said telephone line with an information signal, said means for modulating being in series with said means for drawing power, said means for modulating performed by a modulator comprising a Darlington pair;

means for sensing an amount of distortion in said telephone line interface circuit, said means for sensing being connected in series with said means for drawing power and said means for modulating; and means for feeding back said sensed amount of distortion to said telephone line interface circuit.

18. A telephone line interface circuit for placing an information signal on a telephone line comprising:

a line modulator for receiving an information signal, said line modulator coupled to said telephone line for modulating said telephone line with said information signal, said line modulator comprising a Darlington pair; and a sense resistor coupled to said line modulator so as to sense a current through said line modulator;

such that said line modulator incorporates said current through said sense resistor and said information signal.

* * * * *